(12) United States Patent
Kawai et al.

(10) Patent No.: US 6,707,335 B2
(45) Date of Patent: *Mar. 16, 2004

(54) CONTROL METHOD OF CHARGE-PUMP CIRCUIT

(75) Inventors: Shuhei Kawai, Oizumi-machi (JP); Takao Myono, Menuma-machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/177,862

(22) Filed: Jun. 20, 2002

(65) Prior Publication Data

US 2003/0011420 A1 Jan. 16, 2003

(30) Foreign Application Priority Data

Jul. 9, 2001 (JP) .......................... 2001-208344

(51) Int. Cl.[7] ................................ G05F 3/02
(52) U.S. Cl. .......................... 327/536; 363/59
(58) Field of Search ................. 327/534, 536, 327/537; 363/59

(56) References Cited

U.S. PATENT DOCUMENTS

| | | | | | |
|---|---|---|---|---|---|
| 5,008,799 A | * | 4/1991 | Montalvo | .................. | 363/60 |
| 5,059,815 A | * | 10/1991 | Bill et al. | .................. | 327/536 |
| 5,574,634 A | * | 11/1996 | Parlour et al. | .............. | 363/59 |
| 5,812,018 A | * | 9/1998 | Sudo et al. | ................ | 327/537 |
| 6,008,690 A | * | 12/1999 | Takeshima et al. | ......... | 327/534 |
| 6,373,324 B2 | * | 4/2002 | Li et al. | ................... | 327/536 |
| 6,400,210 B2 | * | 6/2002 | Myono | ..................... | 327/536 |
| 6,437,637 B2 | * | 8/2002 | Myono | ..................... | 327/536 |
| 6,445,243 B2 | * | 9/2002 | Myono | ..................... | 327/536 |

* cited by examiner

Primary Examiner—Terry D. Cunningham
(74) Attorney, Agent, or Firm—Fish & Richardson P.C.

(57) ABSTRACT

Malfunctioning is prevented with a charge-pump circuit which boosts a voltage in increments of less than power supply voltage. The charge-pump circuit has switches S1, S2 and S3 which connect capacitors 1 and 2 to a pumping node in series or in parallel accordingly to the following control steps.

① The switch S2 is turned ON to connect the capacitors 1 and 2 in series while the clock CLK is at L level.
② The switch S2 is turned OFF.
③ The clock CLK is changed to H level.
④ The switches S1 and S3 are turned ON to connect the capacitors 1 and 2 in parallel.
⑤ The switches S1 and S3 are turned OFF.
⑥ The clock CLK is changed to L level.

3 Claims, 6 Drawing Sheets

CONTROL METHOD OF CHARGE-PUMP CIRCUIT

BACKGROUND OF THE INVENTION

The present invention relates to a charge-pump circuit outputting converted voltage in increments of less than a power supply voltage Vdd, and a control method thereof, particularly a control method of a charge-pump circuit capable of normal charge-pumping operation removing influence of a parasitic diode associated with a charge transfer device.

The charge-pump circuit devised by J. F. Dickson generates higher voltage than power supply voltage Vdd of an LSI chip by connecting plural stages of the pumping packet in series to boost the voltage. For example, it is used for generating voltage for program/erase of flash memories.

However, the conventional charge-pump circuit carries out voltage conversion in increments of the power source voltage Vdd, and a circuit capable of carrying out voltage conversion in increments of less than the power supply voltage Vdd had not yet been proposed. Efficiency of the power supply circuit can be significantly improved, if a voltage boosting in increments of e.g. 0.5 Vdd is realized.

So, the inventor has already proposed a charge-pump circuit capable of carrying out voltage conversion in increments of less than the power supply voltage Vdd and improving efficiency η of the circuit (U.S. patent application Ser. No. 09/732,944 filed on Dec. 8, 2000).

The outline thereof will be described below. FIG. 9 and FIG. 10 are circuit diagrams showing a circuitry and operation of +0.5 Vdd voltage boosting charge-pump circuit. The charge-pump circuit generates a boosted voltage of 1.5 Vdd from an input voltage Vdd.

Diodes D1 and D2 (charge transfer devices) are connected in series. The power supply voltage Vdd is provided as an input voltage Vin to an anode of the diode D1. Each of the diodes D1 and D2 can be realized with a MOS transistor with its gate and drain connected together. Switches S1, S2 and S3 connect two capacitors 1 and 2 to a connecting point between the diodes D1 and D2, alternating between in parallel and in series.

The switches S1, S2 and S3 can be implemented with MOS transistors. A clock driver 3 provides the capacitors 1 and 2 with clock CLK. An output of the clock driver 3 is connected to one of the terminals of the capacitor 2. A power supply voltage to the clock driver 3 is Vdd, and amplitude of the clock is Vdd. The clock driver can be implemented with two stages of CMOS inverters for example.

The boosted voltage outputted from the diode D2 is supplied to a load 4. The output node of the diode D2 has a capacitance CL.

Next, the operation of the charge-pump circuit will be explained referring to the FIGS. 9, 10 and 11. FIG. 11 is an operating waveform chart of the charge-pump circuit. For the sake of simplicity, a voltage drop VF of the diode D1 and D2 is assumed 0 V, and the capacitances of the condensers C1 and C2 are assumed equal.

When input clock CLK of the clock driver 3 is at low level (CLK=Low), and assuming that S1 is OFF, S2 is ON and S3 is OFF, two capacitors 1 and 2 are connected in series to a connecting node (pumping node) between the diodes D1 and D2, as shown in FIG. 9. Thus the voltage at the connecting node V1 is Vdd and each of the capacitors 1 and 2 are charged to 0.5 Vdd respectively.

At this time, a current Iout from the power supply Vdd flows through the diode D1, and into the capacitors 1 and 2. The same current Iout flows into the clock driver 3.

Next, as shown in FIG. 10, the input clock of the clock driver 3 changes to high (CLK=High), and the switches turn to S1=ON, S2=OFF and S3=ON. Thus the two capacitors 1 and 2 are connected to the connecting node of the diodes D1 and D2 in parallel. Since the voltage of each of the capacitors 1 and 2 is Vdd/2 and the output voltage of the clock driver 3 is Vdd, the voltage V1 at the connecting node (pumping node) between the diode D1 and D2 is boosted to 1.5 Vdd.

At this time, a current which flows from the two capacitors 1 and 2 to the diode D2 is 2 Iout, and the same amount of current 2 Iout flows out from the clock driver 3.

Followings stand in a steady state, assuming that the output current from the diode D2 is steady at 2 Iout, and taking average current over time for each current.

1) Vout=1.5 Vdd where the power supply voltage of the driver is Vdd.
2) Input current=0.5 Iout
3) Current from the power supply Vdd of the clock driver=Iout.

An important point of this embodiment of the charge pump circuit is that the boosting in increments of 0.5 Vdd is done by repeating charging the capacitors 1 and 2 connected in series and discharging them connected in parallel. It is also important that the input current Iin=Iout from the power supply Vdd is a ½ of the output current 2 Iout. Because of this, the theoretical efficiency η of the circuit can be 100% and there is no loss in boosting to 1.5 Vdd, when no regulation is made on the output voltage.

The input current is a sum of 2 Iout while CLK=H and Iout while CLK=L. Thus, the efficiency η of the charge-pump circuit
=output power/input power
=(1+0.5)·Vdd·Iout/Vdd·(1+0.5)·Iout
=1=100%

Therefore, the charge-pump circuit described above can be regarded in effect as a 0.5 stage charge-pump circuit. And the efficiency η of the circuit can be made 100%. The voltage of 0.5 Vdd can be generated by other methods, for example by a resistance voltage divider. However, it can not realize the efficiency η of 100%, being a certain power loss inherent in it.

On the other hand, the power loss can be made 0% theoretically with the charge-pump circuit proposed by the inventor, since the connection of the capacitors are alternated between series and parallel in accordance with the level of the clock CLK.

If the two capacitors 1 and 2 are kept in series (S1=OFF, S2=ON, S3=OFF) during the operation regardless of the level of the clock CLK, then the circuit operates in the same way as the conventional charge-pump resulting in Vout=2 Vdd. In this case, a switch control circuit (not shown) provides the switches S1, S2 and S3 with the switch control signal whether to keep the capacitors 1 and 2 always in series or to alternate between series and parallel in accordance with the level of the clock CLK.

That is to say, the charge-pump circuit of the embodiment can generate either 1.5 Vdd or 2 Vdd. In other words, it can be switched between 0.5 stage and 1 stage charge-pump.

However, a detailed examination by the inventor had proved that a malfunction occurs in the transition from the status of the FIG. 9 to the status of the FIG. 10 as well as in the reverse transition, if the timing to switch the S1, S3 and S3 is not aligned properly.

For example, in the transition from the status of the FIG. 9 to the status of the FIG. 10, the voltage V1 at the connection between the diodes D1 and D2 becomes 2 Vdd, if the clock CLK is changed from L level to H level while the switch S2 is ON.

Also, in the transition from the status of the FIG. 10 to the status of the FIG. 9, the voltage V1 at the connection between the diodes D1 and D2 becomes 0.5 Vdd, if the clock CLK is changed from H level to L level while the switches S1 and S3 are ON.

SUMMARY OF THE INVENTION

An object of the invention is to prevent the malfunctioning of the charge-pump circuit which boosts a voltage in increments of less than the power supply voltage Vdd.

A control method of the charge-pump circuit of this invention is to align the timing of the change in the clock CLK and the switching of the S1, S2 and S3. The control is done in steps ①–⑦ described below.

① The switch S2 (the first switching means) is turned ON to connect the capacitors 1 and 2 in series while the clock CLK is at L level.
② The switch S2 is turned OFF.
③ The clock CLK is changed to H level.
④ The switches S1 and S3 (the second switching means) are turned ON to connect the capacitors 1 and 2 in parallel.
⑤ The switches S1 and S3 are turned OFF.
⑥ The clock CLK is changed to L level.
⑦ Repeat the steps ① through ⑥. +dr

DETAILED DESCRIPTION OF THE INVENTION

An embodiment of the invention will be described below with reference to the drawings. FIG. 1 through FIG. 6 are circuit diagrams showing circuitry and operation of the charge-pump circuit outputting +0.5 Vdd boosted voltage. The charge-pump circuit generates 1.5 Vdd for the input voltage Vdd.

Figure 9:
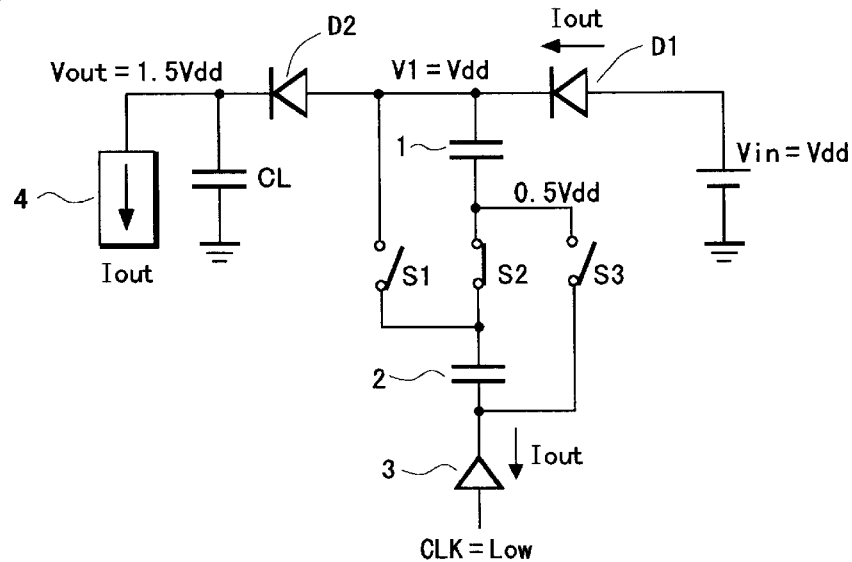
FIG. 9 is a circuit diagram showing a circuitry and an operation of the conventional charge-pump circuit.
Figure 10:
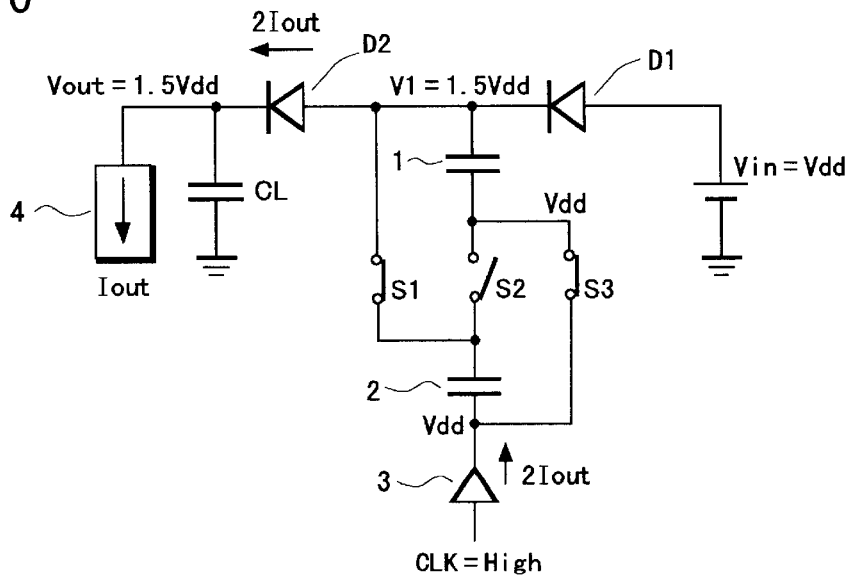
FIG. 10 is a circuit diagram showing the circuitry and the operation of the conventional charge-pump circuit.
Figure 11:
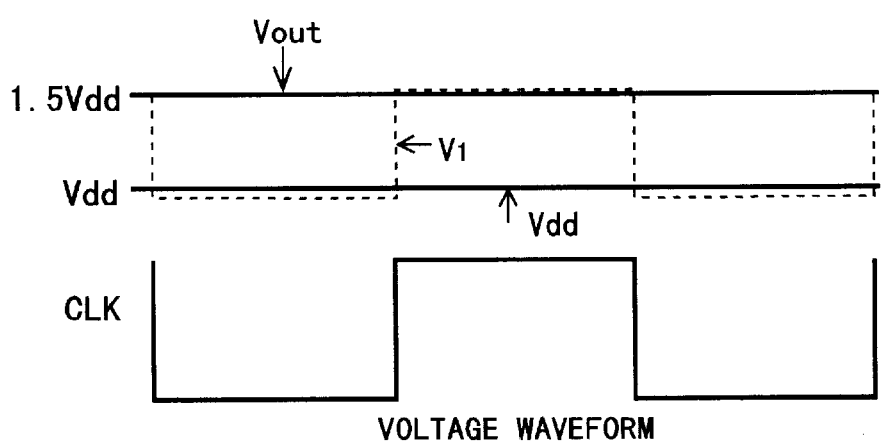
FIG. 11 is a waveform chart showing the operation of the conventional charge-pump circuit.

Explanation of the circuitry of the charge-pump is omitted since it is the same as one shown in FIG. 9 and FIG. 10. Although the charge transfer devices are shown as diodes, it is possible to replace them with MOS transistors.

A control method of the charge-pump circuit having the above-mentioned circuitry will be described below, referring to FIG. 1 through FIG. 7. FIG. 7 is a first timing chart to describe the control method of the charge-pump circuit.

It is assumed that a supply voltage to the clock driver 3 is Vdd, the same voltage as the input voltage (5 V for example), and that capacitances of the capacitor 1 and 2 are equal. It is further assumed that voltage drops caused by the diode D1 and D2 (charge transfer device) and by the switch S1, S2 and S3 are zero. Switching control of S1, S2 and S3 is done by a control circuit, which is not shown.

(1) First Control Step

At time t1, the switch S2 is turned ON (the switches S1 and S3 are OFF), while the input clock CLK to the clock driver 3 is at L level. With this, the two capacitors 1 and 2 are connected to the pumping node in series. Thus the capacitors 1 and 2 are charged to 0.5 Vss respectively, and the voltage V1 at the pumping node becomes Vdd. As shown in the FIG. 1, VA=VB=0.5 Vdd and VC=0 V. Input current Iout flows through the diode D1, and Iout flows into the clock driver 3 (Refer to FIGS. 1 and 7). As shown in the figure, VA is a voltage at the connecting node between the capacitor C1 and the switch S2, VB is a voltage at a connecting node between the switch S2 and the capacitor 2 and VC is a voltage at a connecting node between output of the clock driver 3 and the capacitor 2.

(2) Second Control Step

Next, at time t2, the switch S2 is turned OFF, while the clock CLK is at L level. With this, all of the switches S1, S2 and S3 are OFF, and the voltage at each of the nodes are kept unchanged (Refer to FIG. 2 and FIG. 7).

(3) Third Control Step

Next, at time t3, the clock CLK is changed to H level (CLK=H) from L level, while all of the switches S1, S2 and S3 are kept OFF. (Refer to FIG. 3 and FIG. 7).

(4) Fourth Control Step

Next, at time t4, the switches S1 and S3 are turned ON to connect the capacitors 1 and 2 to the pumping node in parallel. Thus the voltage V1 at the pumping node changes to 1.5 Vdd. At this time, VA=Vdd and VB=1.5 Vdd, and current 2 Iout flows from the clock driver 3 into the capacitors 1 and 2, and the same amount of current 2 Iout flows through the diode D2 (Refer to FIG. 4 and FIG. 7)

(5) Fifth Control Step

Next, at time t5, the switches S1 and S3 are turned OFF, while the clock CLK is kept at H level. With this, all of the switches S1, S2 and S3 are turned OFF and the voltage at each of the nodes is kept unchanged (Refer to FIG. 5 and FIG. 7).

(6) Sixth Control Step

Figure 1:
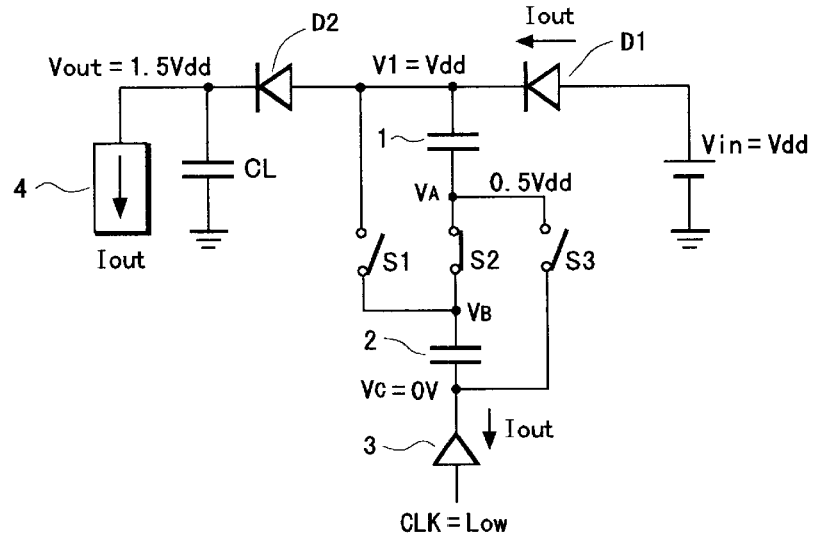
FIG. 1 is a circuit diagram showing a control method of the charge-pump circuit according to an embodiment of the invention.
Figure 2:
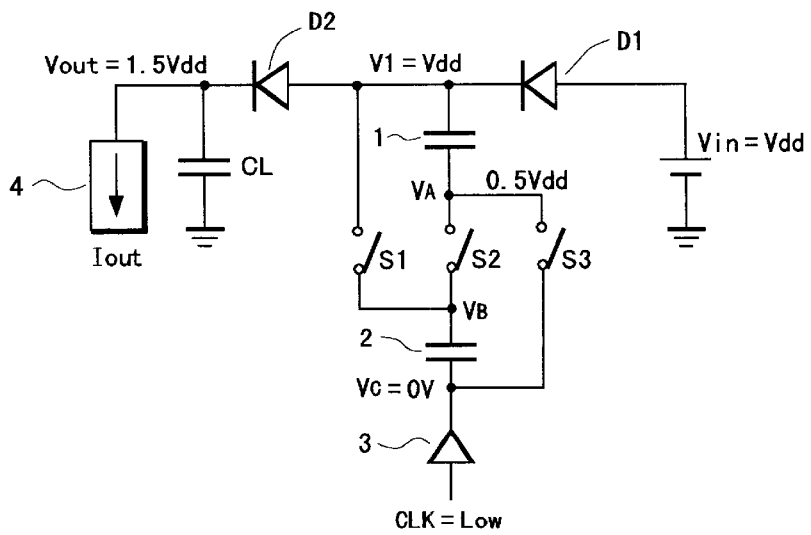
FIG. 2 is a circuit diagram showing the control method of the charge-pump circuit according to the embodiment of the invention.
Figure 3:
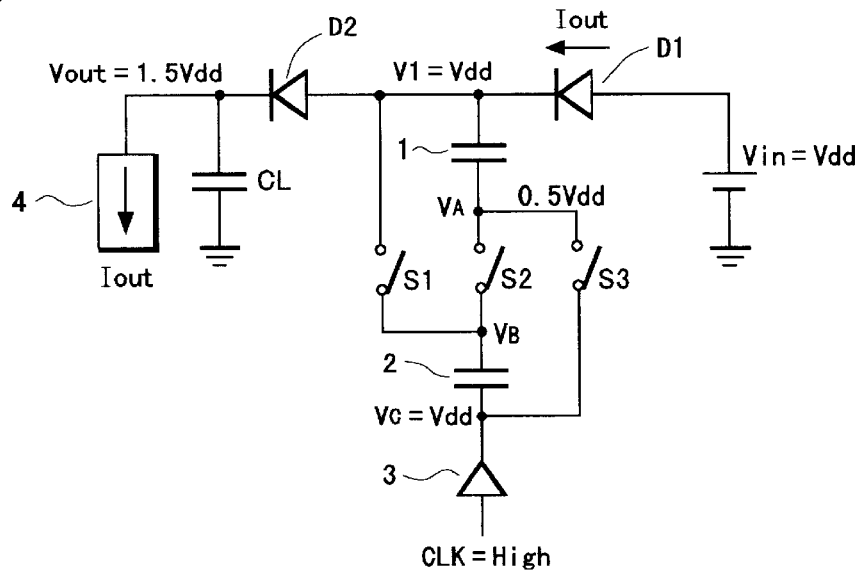
FIG. 3 is a circuit diagram showing the control method of the charge-pump circuit according to the embodiment of the invention.
Figure 4:
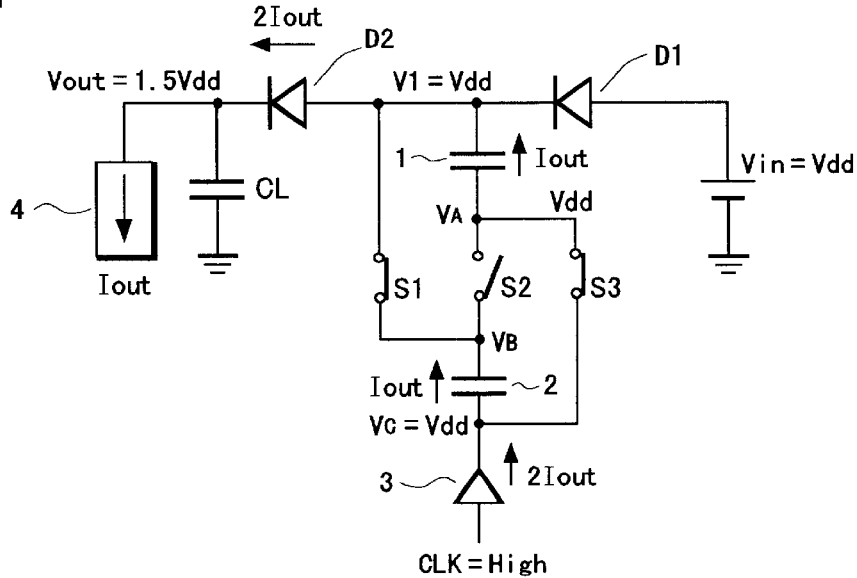
FIG. 4 is a circuit diagram showing the control method of the charge-pump circuit according to the embodiment of the invention.
Figure 5:
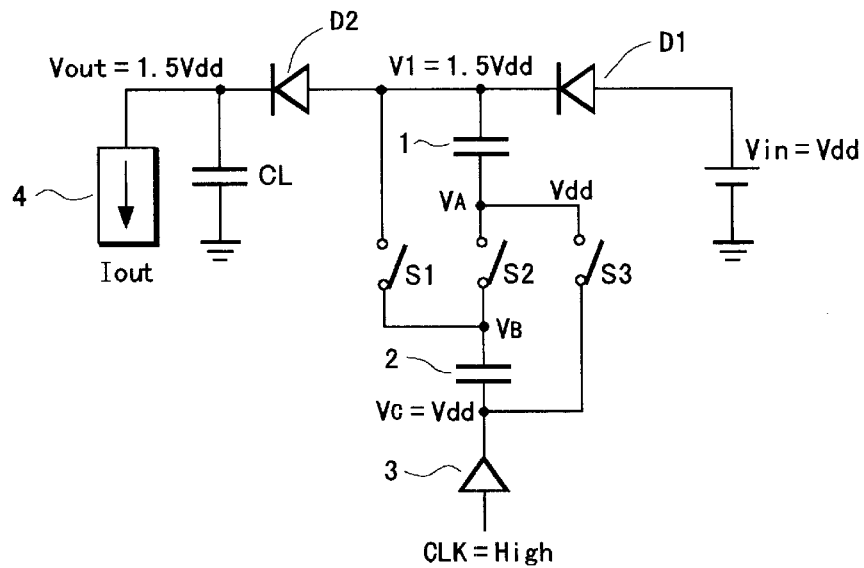
FIG. 5 is a circuit diagram showing the control method of the charge-pump circuit according to the embodiment of the invention.
Figure 6:
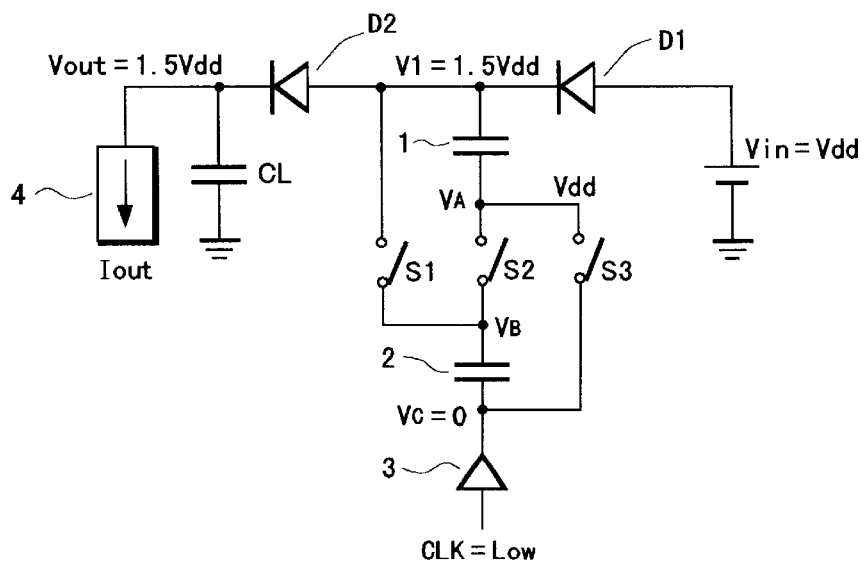
FIG. 6 is a circuit diagram showing the control method of the charge-pump circuit according to the embodiment of the invention.
Figure 7:
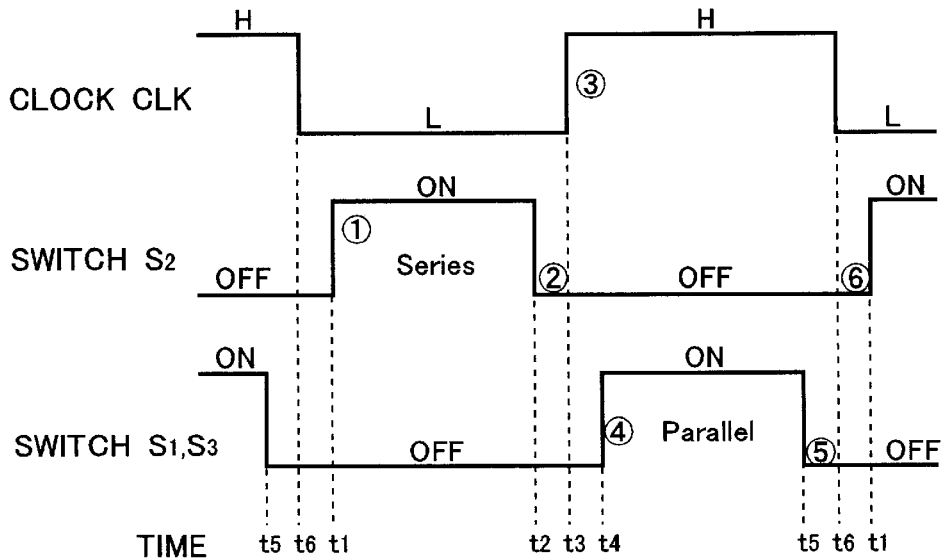
FIG. 7 is a timing chart showing the control method of the charge-pump circuit according to the embodiment of the invention.

Next, at time t6, the clock CLK is changed from H level to L level, while all of the switches S1, S2 and S3 are OFF (Refer to FIG. 6 and FIG. 7).

After that, returning to the above-mentioned first control step, the first through sixth steps are repeated.

According to the above-mentioned control method, the malfunction of the charge-pump circuit is prevented, since the voltage V1 at the pumping node varies only between Vdd and 1.5 Vdd, as a result of the alignment made to the timing of the change in the clock CLK and to the timing of the switching of S1, S2 and S3.

Although the embodiment shows an example applied to a single stage charge-pump which outputs +0.5 Vdd boosted voltage, the invention can be applied to a double stage charge-pump circuit which outputs +1.5 Vdd boosted voltage by increasing the number of the stages of the charge-pump.

In general, the invention can be applied to a multi-stage charge-pump circuit, which incorporates the charge-pump circuit of the embodiment as a core.

Figure 8:
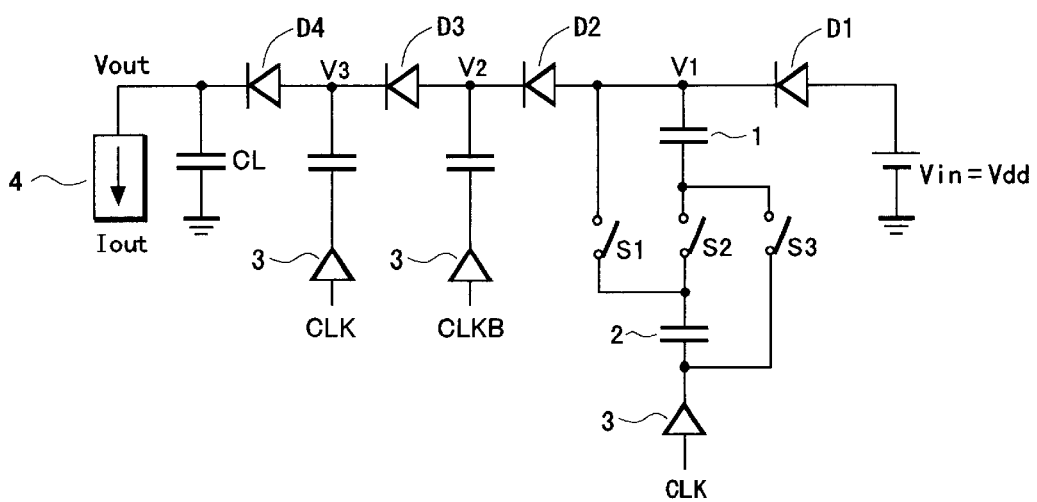
FIG. 8 is a circuit diagram showing the control method of the charge-pump circuit according to the embodiment of the invention.

The multi-stage charge-pump circuit takes a structure with the first stage charge-pump circuit outputting e.g. 0.5 Vdd, and the second and higher stages of Dickson type conventional charge-pump circuits, as shown in FIG. 8. In the case of the charge-pump circuit shown in FIG. 8, the output voltage Vout is 3.5 Vdd.

Although the charge-pump circuit of the embodiment generates the boosted voltage in increments of 0.5 Vdd by changing the connection of the two capacitors 1 and 2 alternating between series and parallel, it is also possible to generate the boosted voltage in increments of less than 0.5 Vdd by changing connection of more than two capacitors alternating between series and parallel. The present invention is also applicable to such a charge-pump circuit.

In the charge-pump circuit which boost a voltage in increments of less than the power supply voltage by alternately connecting capacitors to the pumping node in series and in parallel, the control method of the charge-pump circuit of this invention prevents the pumping node voltage from transient abnormal voltage. The effect of the invention is keeping the operation of the charge-pump normal as well as improving the power efficiency.

What is claimed is:

1. A control method of a charge-pump circuit comprising:

first and second charge transfer devices connected in series;

first and second capacitors;

a clock supplying means supplying clock to one end of the second capacitor;

first switching means for connecting said first and second capacitors to a connecting point of the first and second charge transfer devices in series; and second switching means for connecting said first and second capacitors to the connecting point of the first and second charge transfer devices in parallel;

wherein a positive boosted voltage is outputted from the charge-pump circuit through the second charge transfer device;

said control method comprising:

a first step connecting the first and the second capacitors in series by turning the first switching means ON while the clock is at low level;

a second step turning the first switching means OFF;

a third step changing the clock to high level;

a fourth step connecting the first and the second capacitors in parallel by turning the second switching means ON;

a fifth step turning the second switching means OFF; and a sixth step changing the clock to low level;

wherein said first through sixth steps are repeated.

2. A control method of a charge-pump circuit of claim 1, wherein said first and second charge transfer devices are diodes.

3. A control method of a charge-pump circuit of claim 1, wherein said first and second charge transfer devices are MOS transistors.

* * * * *